Patented Feb. 19, 1952

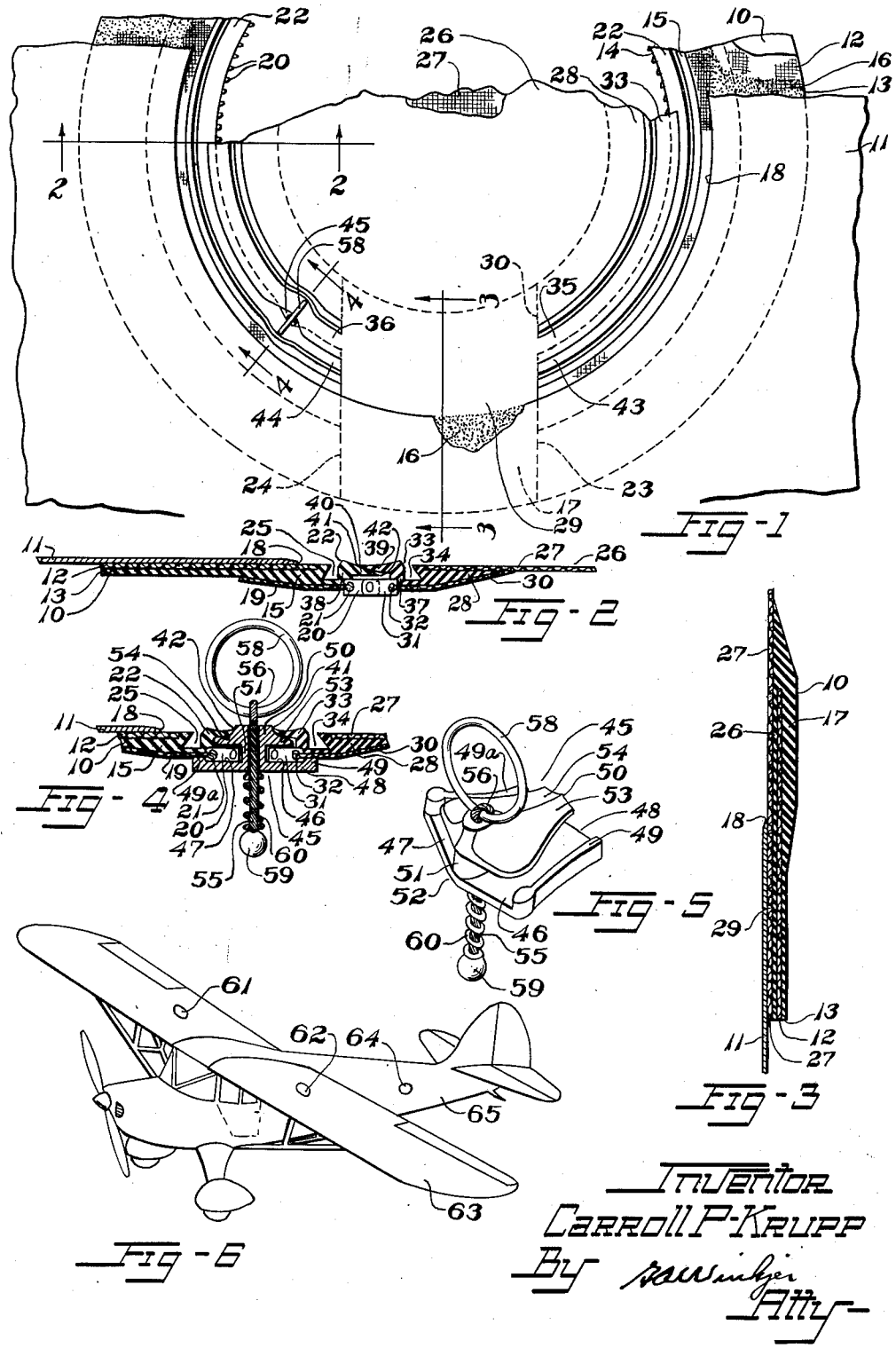

2,586,062

UNITED STATES PATENT OFFICE 2,586,062

PANEL CLOSURE ASSEMBLY

Carroll P. Krupp, Barberton, Ohio, assignor to The B. F. Goodrich Company, New York, N. Y., a corporation of New York Application December 18, 1947, Serial No. 792,532

2 Claims. (Cl. 160—354)

1

The invention relates to panel closure assemblies for wall access-openings of structures and especially to such assemblies of the sealing type for the access-openings of aircraft, ships, gasoline tank trucks and other vehicles.

Objects of the invention are to provide an improved panel closure assembly having provision for fastening the panel about its periphery; to provide for peripheral sealing of the assembly; to provide for tautness of flexible material of the assembly; to provide for engagement and disengagement of the closure by manipulation from either or both faces of the wall; to provide for resilient hinging action of the panel; to provide for avoiding accidental loss of parts; and to provide for simplicity and flexibility of construction, convenience of manufacture and installation, and for effectiveness of operation.

These and other objects and advantages of the invention will be apparent from the following description.

In the drawings, which form a part of this specification and in which like numerals are employed to designate like parts throughout the same, Fig. 1 is a plan view of a panel closure assembly in the closed condition mounted at a wall access-opening and constructed in accordance with and embodying the invention, parts being broken away;

Fig. 2 is a sectional view taken along line 2—2 of Fig. 1, parts being broken away;

Fig. 3 is a sectional view taken along line 3—3 of Fig. 1, parts being broken away;

Fig. 4 is a sectional view taken along line 4—4 of Fig. 1, parts being broken away;

Fig. 5 is a perspective view from above of a runner for the closure assembly, and Fig. 6 is a view of the closure assembly applied to several access-openings of an airplane.

In the illustrative embodiment of the invention shown in the drawings, the closure assembly has an annular, flexible structure or mounting ring 10 of resilient rubber or other rubber-like material preferably impervious to liquids and gases. The closure assembly including the structure 10 is mounted at a face of a wall 11 which may be sheet aluminum or other suitable stiff material or may be a treated fabric covering of an aircraft wing 63 or fuselage 65, as shown especially in Fig. 6.

The flexible structure 10 may be formed to the flat ring shape shown in the drawings as by molding the rubber-like material thereof under heat and pressure, during which molding an annular reinforcement 12 of rubber coated or impregnated textile sheet material may be united flush with the attaching surface of the flexible structure. The reinforcement 12 extends radially inward from the outer peripheral edge at 13 of the structure and desirably terminates short of the inner edge at 14 to provide a flexible inner margin 15. The flexible structure 10 is attached to the wall 11 by an adhesive material 16 or in any suitable manner to provide a fluid-tight joint.

The flexible structure 10 has a hinge receiving recessed portion 17 preferably formed in the reinforced surface during the molding operation, as shown especially in Figs. 1 and 3. The reinforcement 12 may extend continuously through the recessed portion 17.

When the flexible structure 10 is assembled with the wall 11, the inner margin 15 extends circumferentially and radially inward beyond the marginal edge at 18 of the wall 11 at the access-opening therein. The margin 15 of the structure 10 increases in thickness toward its inner periphery, as shown especially in Fig. 2, to promote maintenance of the desired aligned position thereof with respect to an inner panel 26.

The closure assembly has a slide fastener structure of which structure a flexible stringer 19 of suitable rubber coated or impregnated textile material may be secured to the margin 15 at the surface thereof opposite that of the reinforcement 12 and a series of spaced-apart teeth 20, 20 are disposed at the beaded marginal edge 21 of the stringer 19.

A flexible closing element 22 of resilient rubber or other rubber-like material is desirably molded directly upon the teeth 20, 20 and extends peripherally about the structure from the side at 23 of the recessed portion 17 to the other side at 24 thereof. The sealing element 22 is in radially spaced relation to the thickened part of the margin 15 in continuation of the rubber material thereof overlying the stringer 19 facilitating the provision of a groove 25 therein, as shown especially in Fig. 2. This arrangement advantageously makes possible continuity of fluid-tightness at the margin 15 together with axial flexibility thereof, while assuring the desired aligned positioning of the teeth and the closing element for engaging and disengaging purposes.

An inner panel 26 desirably of suitable flexible, rubber-like material having a suitable textile reinforcement 27 is disposed centrally of the flexible structure 10 in the space defined by the inner margin 15. The panel 26 of circular form has a flexible peripheral margin 28 for coacting with the margin 15, which margin 28 increases in thickness toward its periphery and has an extension or hinge portion 29 of the peripheral margin 28 projecting radially and seating in the recessed portion 17, as shown especially in Figs. 1 and 3. The extension 29 and the recessed portion 17 may be substantially coextensive circumferentially and secured together by a suitable rubber cement to provide the desired hinged connection. The construction permits centrally locating the panel 26 with respect to the flexible structure 10, and makes possible resilient hinging movement of the panel relative to such structure to facilitate freedom of access through the closure assembly.

The peripheral margin 28 has a flexible stringer 30 of suitable textile material extending peripherally about the panel from the side at 23 to the other side at 24 of the hinged connection. Spaced-apart teeth 31, 31 are disposed at the beaded marginal edge 32 of the stringer for engaging and disengaging the teeth 20, 20.

A flexible closing element 33 of suitable resilient rubber-like material is desirably molded directly on the teeth 31, 31. It also extends peripherally about the panel from the side at 23 to the side at 24 of the hinged connection in radially spaced relation to the thickened part of the margin 28 to provide a groove 34. The rubber-like material of the closing element 33 is in continuation of the rubber-like material of the margin 28 at the base of the groove 34 for fluid-tightness purposes. The respective end portions 35, 36 of the closing element 33 merge with the rubber material of the extension 29 for continuity of sealing with the extension 29. The arrangement facilitates flexibility of the closing element 33 and the stringer 30 and assures positioning the closing element for contacting the other closing element 22 in overlapping relation therewith.

The closing elements 22, 33 provide sealing by lip-action which is that sealing action effected by a flexible sealing element, the edge of which may be termed a lip, in contact with and preferably pressed against a sealing surface so as to seal effectively at low pressure differences approaching zero and also at high pressure differences. To this end the closing elements 22, 33 may be generally L-shaped in cross-section providing base portions 37, 38 and laterally tapered portions 39, 40 projecting toward one another and terminating in edges at 41, 42.

For the closed condition the edge at 41 of the closing element 33 resiliently presses against the tapered portion 40 of the other element 22 sealing effectively the margins 15 and 28. At the side 23 of the hinged connection, the end portion 35 is disposed in overlapping relation and is adhesively united with an end portion 43 of the closing element 22 and the extension 29. A similar construction at the side 24 of the hinged connection is provided at the end portion 36 of the closing element 33 and an end portion 44 of the closing element 22. However, the stringers 19 and 30 and the end portions 36 and 44 are spread apart radially to accommodate a runner 45 and diverge like the passageways 46, 47 of the runner to permit positioning the teeth 20, 20 and 31, 31 in the runner.

The runner 45 has a lower plate 48 including side flanges 49, 49a in spaced relation to an upper plate 50 which plates are interconnected at the opening end at 52 of the runner 45 by a hollow center post 51 of streamline shape in cross-section. The upper plate 50 constitutes a ridged platform having side sealing surfaces 53, 54 extending longitudinally and inclined downwardly relative to the lower plate 48, as shown especially in Figs. 4 and 5. This construction facilitates flexing and resiliently maintaining the closing elements in contact with the sealing surfaces 53, 54 by lip-action of the edges at 41, 42.

For manipulation of the runner from either or both faces of the closure assembly, a flexible pull element 55 of braided wire cable is disposed in the bore extending through the hollow center post 51 and through the lower 48 and the upper plate 50. The pull element 55 may have a looped portion 56 at one end thereof engaging a metallic ring 58 or pull tab and may have a beaded head portion 59 at its other end. A compression spring 60 axially encloses the pull element 55 between the lower plate 48 and the portion 59 for maintaining the ring 58 close to the upper plate 50. The ring 58 is disposed free of the closing elements 22 and 33 to avoid interference with the desired positioning of the closing elements. The arrangement permits grasping either the ring 58 or the beaded head portion 59 for exerting pulling force on the runner 45.

As shown especially in Fig. 6, the closure may be applied at access-openings at 61 and 62 in the upper surface of an aircraft wing 63 and also at an access-opening 64 in the surface of a fuselage 65 of the aircraft. When the closure assembly is mounted as described hereinabove and with the closing elements disposed at the side having dominant pressures, the opening in the wing or the fuselage, for example, may be closed and sealed by manipulation of the runner in the counter-clockwise direction with respect to Fig. 1 away from the side at 23 to the side at 24, whereby the slide fastener structure is engaged and the closing elements are disposed in overlapping, sealing relation. The panel 26 is also thus maintained in a taut condition for avoiding objectionable disturbance of the flow of air over the closure when constituting part of an aircraft surface. The manipulation of the runner in the clockwise direction disengages the slide fastener structure and separates the closing elements permitting the panel to be swung to open position by a hinging action across the hinge portion or tab 29 and the united overlapping end portions 35, 43 and 36, 44 of the closing elements for access through the opening in the wall 11. It is thus apparent that the closure assembly may be conveniently engaged and disengaged for opening and closing the access-opening when desired.

Variations may be made without departing from the scope of the invention as it is defined in the following claims.

I claim:

1. A panel closure assembly for a wall access-opening, said assembly comprising a circular ring structure having an inner peripheral portion of resilient rubber-like material of increasing thickness towards its edge and a radial recess in a face of the structure, an inner panel in the space bounded by said peripheral portion having a hinge tab of resilient rubber-like material projecting radially therefrom and disposed in said recess in united relation to said structure for swinging movement of the panel into and out of said space, said panel having a marginal portion of said resilient rubber-like material of increasing thickness toward its edge and extending peripherally about said panel from one side of said hinge tab to the other side thereof, slide fastener means including cooperating fastener elements between and separably joining said peripheral portion and said marginal portion, and closure elements of resilient rubber-like material on said fastener elements at a face of the structure and panel, said closure elements and said fastener elements extending from one side of said hinge tab to the other side thereof and said closure elements merging at their end portions with said hinge tab in sealing relation to both sides of the hinge tab for continuity of closure of said access-opening in the closed condition of the assembly.

2. A panel closure assembly comprising a continuous annular structure of impervious flexible material having an inner peripheral portion and a peripheral protective reinforcement of resilient rubber-like material projecting from said portion at a face of the assembly in spaced-apart relation to the edge of said portion, an inner panel of impervious flexible material in the space bounded by said peripheral portion having a flexible hinge tab of impervious resilient rubber-like material extending outwardly from the panel in inseparable sealed relation to said structure, said inner panel having a marginal portion and a peripheral protective reinforcement of resilient rubber-like material projecting from said marginal portion at said face of the assembly in spaced-apart relation to the edge of the marginal portion, slide fastener means including cooperating fastener elements on the peripheral and marginal portions at said edges thereof releasably joining said structure and said panel, and closure elements of resilient rubber-like material on said fastener elements in spaced-apart relation to said protective reinforcements having an overall height in the joined condition of said fastener elements substantially equal to the height of said protective reinforcements to protect said closure elements against accidental separation and damage, said closure elements and said fastener elements and said protective reinforcements extending peripherally away from one side of said hinge tab to the other side thereof, said closure elements at their junctions with the hinge tab having end portions joined together and joined to the hinge tab in inseparable sealing relation to establish with said tab a hinging zone across the same and to provide continuity of closure about said structure and said panel in the closed condition of the assembly, and said closure elements throughout the remainder of their extent about said structure and said panel being movable into overlapping contacting relation upon closing of said slide fastener means and being separable upon opening of said slide fastener means to permit swinging of said inner panel to an open position by a resilient hinging action in said zone across said hinge tab including the region of joinder of the hinge tab with said end portions of said closure elements.

CARROLL P. KRUPP.

REFERENCES CITED

The following references are of record in the file of this patent:

UNITED STATES PATENTS

| Number | Name | Date |
| --- | --- | --- |
| 2,002,944 | Hathorn | May 28, 1935 |
| 2,383,200 | Kramer et al. | Aug. 21, 1945 |
| 2,385,816 | Krupp | Oct. 2, 1945 |
| 2,391,871 | Benson | Jan. 1, 1946 |